United States Patent [19]

Nakamura et al.

[11] Patent Number: 5,677,486

[45] Date of Patent: Oct. 14, 1997

[54] OSCILLATION GYROSCOPE

[75] Inventors: Takeshi Nakamura, Uji; Katsumi Fujimoto, Kaminiikawa-gun; Kazuhiro Ebara, Toyama, all of Japan

[73] Assignee: Murata Manufacturing Co., Ltd., Japan

[21] Appl. No.: 556,714

[22] Filed: Nov. 13, 1995

[30] Foreign Application Priority Data

Nov. 14, 1994 [JP] Japan .................................. 6-305550
Nov. 14, 1994 [JP] Japan .................................. 6-305551

[51] Int. Cl.$^6$ .................................................. G01C 19/00
[52] U.S. Cl. ........................ 73/504.14; 73/504.12; 73/504.02
[58] Field of Search ........................ 73/504.12, 540.14, 73/504.02; 310/316

[56] References Cited

U.S. PATENT DOCUMENTS

| | | | |
|---|---|---|---|
| 4,799,385 | 1/1989 | Hulsing et al. | 73/505 |
| 5,012,174 | 4/1991 | Adkins et al. | 318/649 |
| 5,349,857 | 9/1994 | Kasanami et al. | 73/505 |
| 5,400,269 | 3/1995 | White et al. | 73/1 E |
| 5,412,204 | 5/1995 | Nakamura | 250/231.12 |

FOREIGN PATENT DOCUMENTS

0 579 974 A1   6/1993   European Pat. Off. ........ G01C 19/56

*Primary Examiner*—Hezron E. Williams
*Assistant Examiner*—Richard A. Moller
*Attorney, Agent, or Firm*—Ostrolenk, Faber, Gerb & Soffen, LLP

[57] ABSTRACT

An oscillation gyroscope 10 includes an oscillator 11 comprising an equilateral triangular prism-shaped vibrating body 12 and piezoelectric elements 14a to 14c. An oscillator circuit 26 including an inverse amplification circuit 28 and a phase circuit 30 is connected between the piezoelectric elements 14a, 14b and the piezoelectric element 14c via resistors 22 and 24. The piezoelectric elements 14a and 14b are connected to a differential amplification circuit 32 and the output signal of a addition signal computing unit 34 is added to the output signal of the differential amplification circuit 32 by an adder 33. A signal of the same phase or an inverse phase with respect to the output signal of the phase circuit 30 or an inverse amplification circuit 28 is level-adjusted and outputted from the addition signal computing unit 34. A composite signal made up of the output signal of the differential amplification circuit 32 and the output signal of the addition signal computing unit 34 is detected by a synchronous detector 36 and smoothed by a smoothing circuit 38.

12 Claims, 12 Drawing Sheets

OSCILLATION GYROSCOPE

BACKGROUND OF THE INVENTION

The present invention relates to an oscillation gyroscope and more particularly to, for example, an oscillation gyroscope which can detect a rotation angular velocity from changes in a direction of oscillation in a bending-mode oscillation of a vibrating body.

Figure 12:
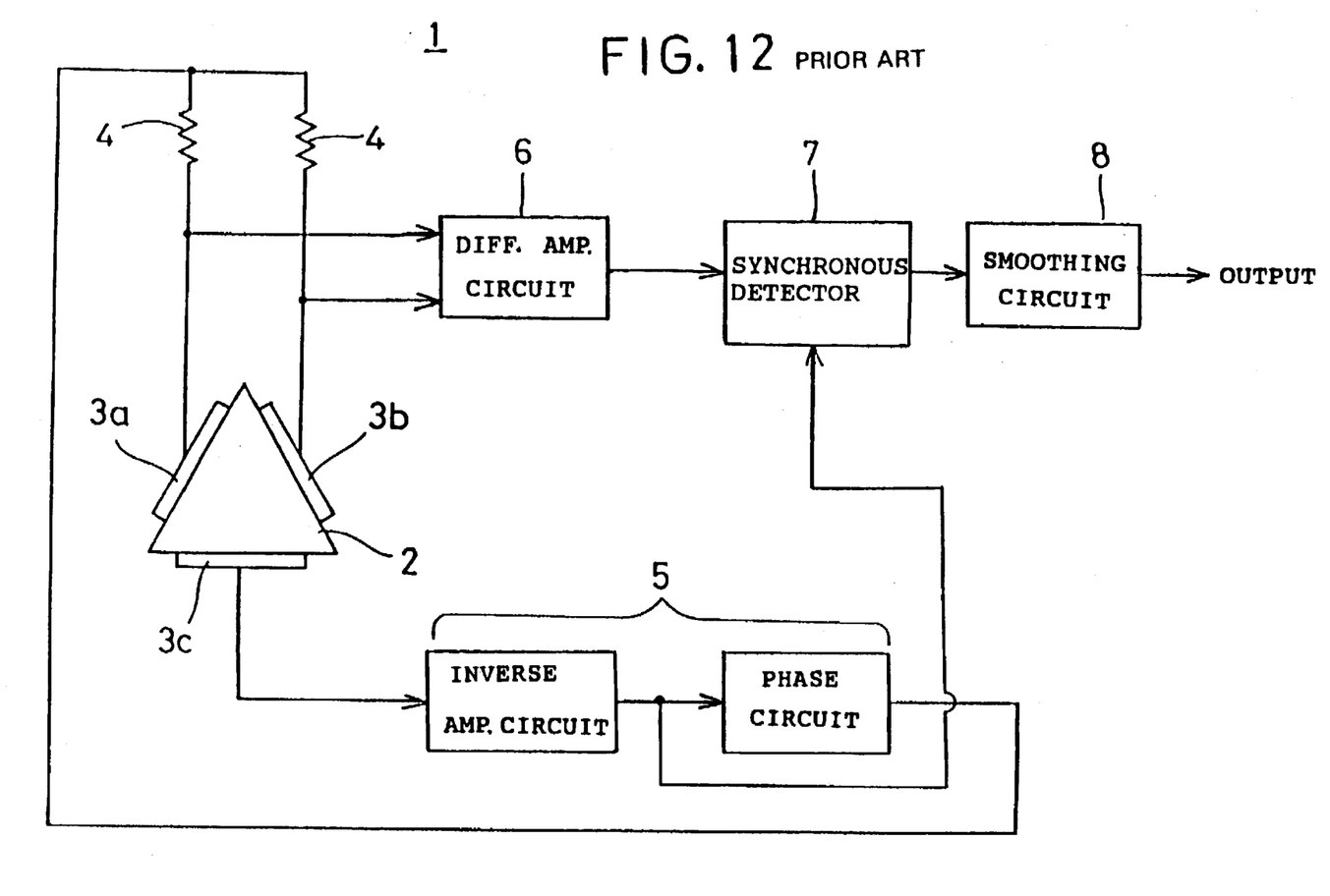
FIG. 12 is an explanatory drawing showing an example of a prior art oscillation gyroscope.

FIG. 12 is an explanatory diagram showing an example of a conventional oscillation gyroscope. Such an oscillation gyroscope is disclosed in the U.S. Pat. No. 5,349,857, for example, the disclosures of which are incorporated by reference. The oscillation gyroscope 1 includes, for example, an equilateral triangular prism-shaped vibrating body 2. On the three side surfaces of the vibrating body 2 piezoelectric elements 3a, 3b and 3c are formed. The piezoelectric elements 3a and 3b are used as drivers for bending-mode oscillation of the vibrating body 2, and are also used as detectors for detecting a signal corresponding to a rotation angular velocity generated by the oscillation gyroscope 1. The piezoelectric element 3c is used to provide feedback for self-excited vibration of the vibration of body 2.

Resistors 4 are connected to the piezoelectric elements 3a and 3b, and between these resistors 4 and the feedback piezoelectric element 3c is an oscillator circuit 5, formed, for example, by an inverted amplification circuit and a phase circuit. Further, the piezoelectric elements 3a and 3b are connected to a differential amplification circuit 6. The output signal of the differential amplification circuit 6 is detected by the synchronous detector 7 and its output is further smoothed by a smoothing circuit 8.

By means of the signal of the oscillator circuit 5, the vibrating body 2 vibrates in a bending-mode in a direction intersecting the formation surface of the piezoelectric element 3c. In this state, ideally, the drive signals inputted to the piezoelectric elements 3a and 3b are the same and no drive signal component is outputted from the differential amplification circuit 6. Also, because the vibrating body 2 bending-mode vibrates in a direction intersecting the formation surface of the piezoelectric element 3c, the signals generated in the piezoelectric elements 3a and 3b due to the vibration are the same and no such signals are outputted from the differential amplification circuit 6. In this manner it is understood that the output signal from the differential amplification circuit 6 is zero, indicating that no rotation angular velocity is imposed on the oscillation gyroscope 1.

When the oscillation gyroscope 1 rotates around the longitudinal axis of the vibrating body 2, the vibration direction of the vibrating body 2 changes due to the Coriolis force. Thereby, a difference occurs between the output signals of the piezoelectric elements 3a and 3b and this difference is outputted from the differential amplification circuit 6. The output signal of the differential amplification circuit 6 is detected in synchronism with a signal of the same phase by the synchronous detector 7. Because the output signal level from the differential amplification circuit 6 corresponds to the level of the rotation angular velocity imposed on the oscillation gyroscope 1, if it is synchronously detected and smoothed by the smoothing circuit 8, the rotation angular velocity can be detected on the basis of the level of the output signal of the smoothing circuit 8.

However, in such an oscillation gyroscope 1, since there are variations in the impedance of the piezoelectric elements 3a, 3b and 3c and variations in the resonance characteristics of the two resonance systems contained in the two piezoelectric elements 3a and 3b, even when no rotation angular velocity is applied to the oscillation gyroscope 1, they do not provide the same signal to the differential amplification circuit 6, so a drive signal component is outputted therefrom. For this reason, an offset adjustment (so that the output of the smoothing circuit 8 is zero when no angular velocity is added thereto) is performed by various circuit designs.

However, because the drive signal component is outputted from the differential amplification circuit even when the offset adjustment has been made so that the output signal from the smoothing circuit without rotation is zero, and because the signal corresponding to the rotation angular velocity is superposed thereon, a large signal is outputted from the differential amplification circuit. As a result, a large dynamic range of the output of the differential amplification circuit and other circuits thereafter must be maintained. Thus the circuits must be designed in consideration of the case where the difference between the output signals of the two piezoelectric detection elements is large, a large rotation angular velocity is added thereto, etc., which makes the energy consumption of the differential amplifier circuit 6 become very high. As a result, the energy consumption of the overall circuit structure also becomes very high.

Figure 13:
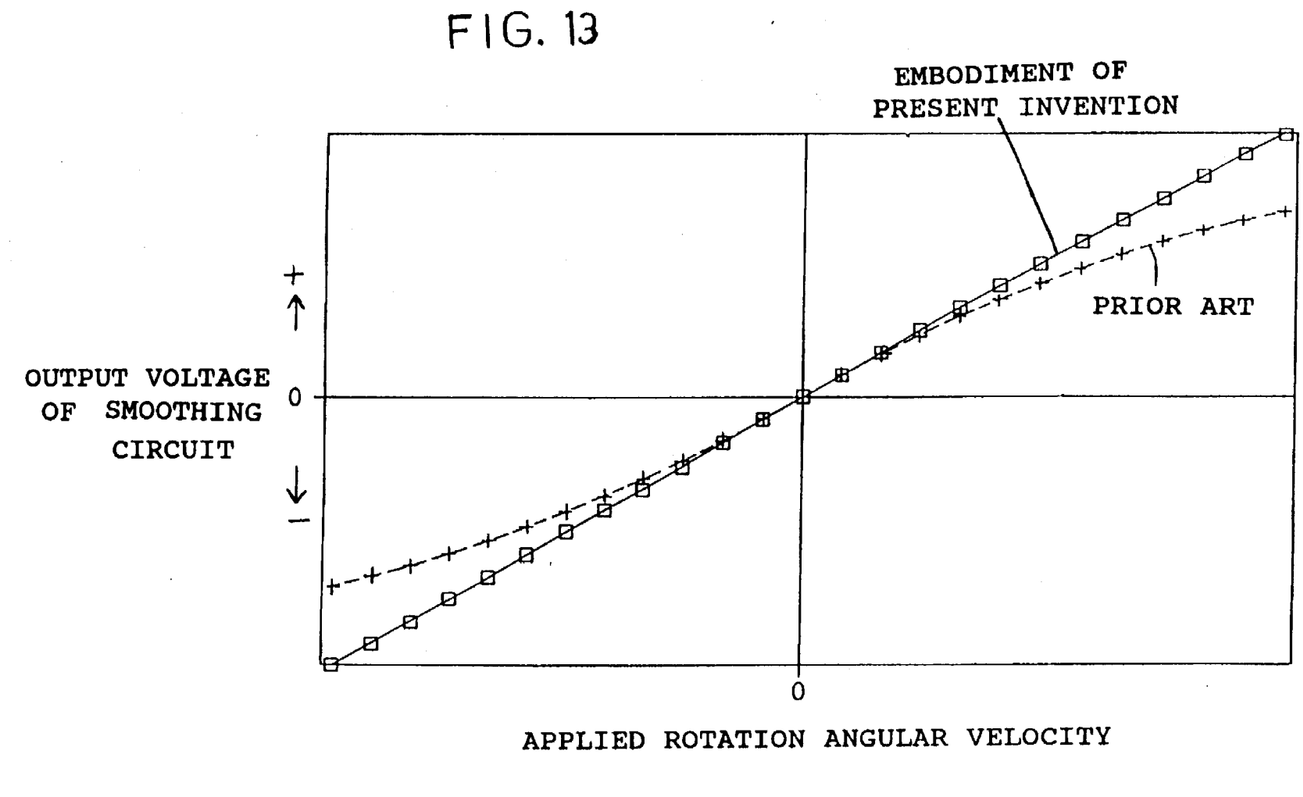
FIG. 13 is a graph shown the relationship of an applied rotation angular velocity and the output signal of a smoothing circuit.

Also, as shown in FIG. 13, where a large enough dynamic range cannot be maintained, if a high rotation angular velocity is applied and the output signal of the differential amplification circuit increases, the linearity between the rotation angular velocity and the output signal of the smoothing circuit is lost and a difference in sensitivity occurs, depending on the direction of the rotation angular velocity.

Given these problems, the main object of the present invention is to provide an oscillation gyroscope which can maintain linearity between the rotation angular velocity and its output signals, and can avoid having a difference in sensitivity due to the direction of rotation, without requiring its dynamic range to be increased.

Another object of the present invention is to provide an oscillation gyroscope which has an offset adjustment.

SUMMARY OF THE INVENTION

This invention relates to an oscillation gyroscope which includes a vibrating body, a plurality of drive detection devices associated with the vibrating body and used in common for driving the vibrating body and detecting a signal corresponding to a rotation angular velocity, an oscillator circuit connected to the drive detection devices for oscillating the vibrating body, a differential circuit connected to the drive detection devices, and an addition signal computing unit generating at least one signal having the same phase, an inverse phase or a phase difference of 90° with respect to an output signal of said differential circuit, and adding the at least one signal to the signal corresponding to the rotation angular velocity.

Where this phase difference is 90°, in order to obtain a signal for adding, the oscillator circuit may include an inverse amplification circuit and a phase circuit for adjusting a phase of an output signal of the inverse amplification circuit, and an output signal of the phase circuit is inputted to the addition signal computing unit.

Also, where the phase difference is 90°, the oscillator circuit may include an inverse amplification circuit and a phase circuit for adjusting a phase of an output signal of the inverse amplification circuit, and may further include a phase correction circuit for modifying the phase of the output signal of the inverse amplification circuit, and an output signal of the phase correction circuit may be inputted to the addition signal computing unit.

Further, where the phase difference is 90°, the oscillation gyroscope may include a summation circuit for synthesizing an output signal of the plurality of said drive detection devices and a phase correction circuit for modifying a phase of an output signal of said summation circuit, and an output signal of said phase correction circuit may be inputted to said addition signal computing unit.

Where this phase difference is the same phase or an inverse phase, in order to obtain a signal for adding, the oscillator circuit may include an inverse amplification circuit and a phase circuit for adjusting a phase of an output signal of the inverse amplification circuit, and an output signal of the phase circuit is inputted to the addition signal computing unit.

Also, where the phase difference is the same phase or an inverse phase, the oscillator circuit may further include a phase correction circuit for modifying the phase of the output signal of the phase circuit, and an output signal of the phase correction circuit may be inputted to the addition signal computing unit.

Further, where the phase difference is the same phase or an inverse phase, the oscillation gyroscope may include a summation circuit for synthesizing an output signal of the plurality of said drive detection devices and a phase correction circuit for modifying a phase of an output signal of said summation circuit, and an output signal of said phase correction circuit may be inputted to said addition signal computing unit.

By adjusting the levels of a signal corresponding to a rotation angular velocity and a signal having a phase difference of 90° and adding them to the output signal of a differential circuit, the level of the output signal of the differential circuit can be reduced. Accordingly, the drive signal component outputted from the differential circuit can be compressed.

Also, by adjusting the levels of a signal corresponding to a rotation angular velocity and a signal of the same phase or an inverse phase and adding them to the output signal of a differential circuit, the phase of the output signal of the differential circuit can be changed and offset adjustment can be achieved. In addition, by adding the above-described signals to the output signal of the differential circuit, the signal level can be reduced.

In order to explain this, the output signal of the differential circuit is calculated as $A \sin(\omega t+\alpha)$ and the signal of the same phase or an inverse phase to a synchronizing signal as $B \cos(\omega t)$. Here, if there is a phase difference of 90° between the output. Signal of the differential circuit and the synchronizing signal, although it is not necessary to perform offset adjustment, displacement of $\alpha$ will occur due to variations in the oscillation system. Upon adding these signals, a composite signal $F(\omega t)$ thereof is as shown in the following equation.

$$F(\omega t) = A \sin(\omega t + \alpha) + B \cos\omega t$$
$$= A \sin\omega t \cos\omega t + A \cos\omega t \sin\alpha + B \cos\omega t$$
$$= A \sin\omega t \cos\alpha + \cos\omega t (A \sin\alpha + B)$$

In order to offset-adjust this composite signal, $B$ is adjusted so that it is 0 when integrated between $-\pi/2 \sim \pi/2$. If so adjusted, the output signal of the smoothing circuit can be made 0. Consequently, if integrated within such these limits, the following equation is obtained.

$$\int F(\omega t) = 2\omega(A \sin\alpha + B) = 0$$

$$\therefore A \sin\alpha + B = 0$$

Thus, $F(\omega t) = A \sin\omega t \cos\alpha$

Here, since $-1 \leq \cos\alpha \leq 1$, and expressing an absolute value as abs, $$abs(A \sin\omega t) \geq abs(F(\omega t))$$

That is, the level of the output signal of a differential circuit in which there is displacement of $\alpha$ is compressed.

According to this invention, since a drive signal component can be compressed by adjusting the level of a signal to be added, even where a signal corresponding to the rotation angular velocity is superposed thereon, the output signal of the differential circuit does not substantially increase. Consequently, it is not necessary to increase the dynamic range of the differential circuit and circuits thereafter any more than is necessary, so that the energy consumption of the circuits can be suppressed. From these results, linearity between the rotation angular velocity and the output signal of the oscillation gyroscope can be achieved and differences in sensitivity due to variations in the direction of rotation can be reduced. Also, by adjusting the level of the signal to be added, offset adjustment of the output signal of the oscillation gyroscope can be performed.

The above-described objects, and other objects, features and advantages of the present invention can be further understood from the following detailed explanation of embodiments thereof with reference to the drawings. Note that in each embodiment the same reference numbers are used to denote components having substantially the same functions.

DETAILED DESCRIPTION OF EMBODIMENTS OF THE INVENTION

Figure 1:
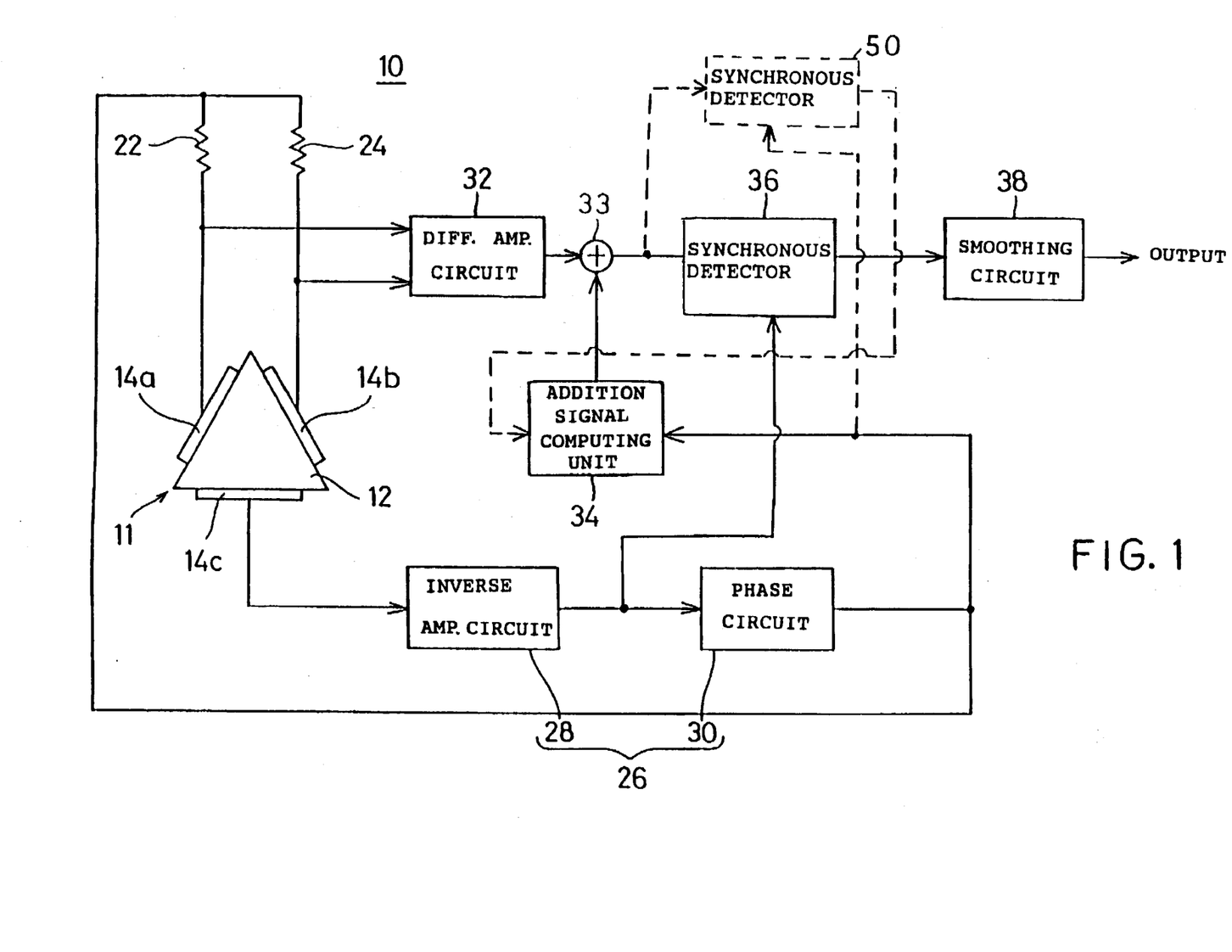
FIG. 1 is an explanatory drawing showing a first embodiment of the present invention.
Figure 2:
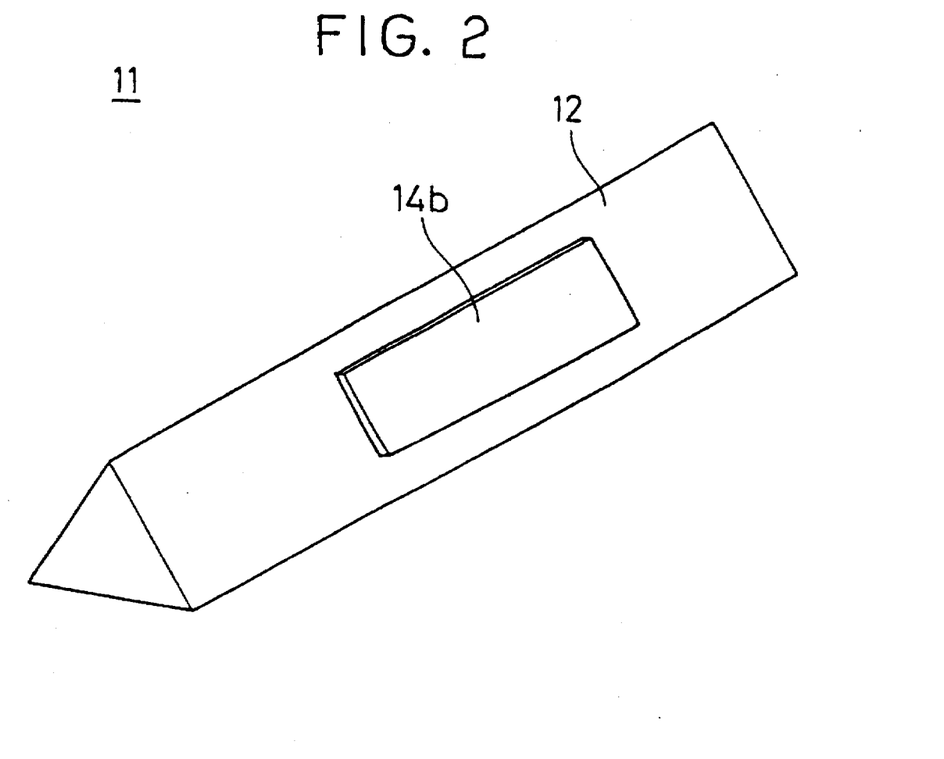
FIG. 2 is a perspective drawing showing an oscillator of the oscillation gyroscope shown in FIG. 1.
Figure 3:
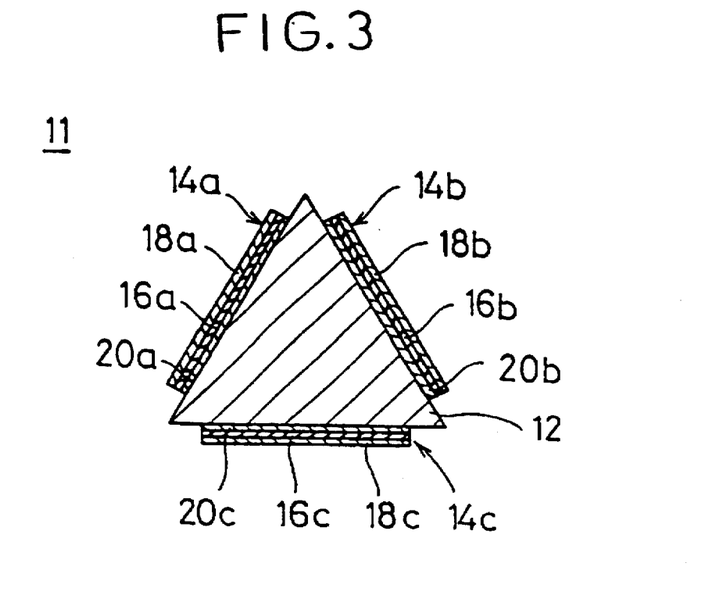
FIG. 3 is a cross-sectional drawing of the oscillator shown in FIG. 2.

FIG. 1 is an explanatory drawing showing a first embodiment of the present invention. An oscillation gyroscope 10 includes an oscillator 11. The oscillator 11, as shown in FIGS. 2 and 3, includes an equilateral triangular prism-shaped vibrating body 12 for example. The vibrating body 12 is formed of a material which generates a normal metallic vibration such as elinvar, an iron-nickel alloy, quartz, glass, a ceramic, etc.

Piezoelectric elements 14a, 14b and 14c are respectively formed on the three side faces of the oscillator 12. The piezoelectric element 14a includes a piezoelectric layer 16a formed of a piezoelectric ceramic for example, electrodes 18a and 20a being formed on the opposite surfaces of the piezoelectric layer 16a. The electrode 20a is bonded to one side face of the vibrating body 12. Similarly, the piezoelectric elements 14b and 14c include piezoelectric layers 16b and 16c, and electrodes 18b and 20b and electrodes 18c and 20c are formed on the opposite surfaces of the piezoelectric layers 16b and 16c, respectively. The electrodes 20b and 20c are bonded to respective side faces of the vibrating body 12.

The piezoelectric elements 14a and 14b are used for driving for bending-mode vibrating the vibrating body 12, and are also used for detection to obtain a signal corresponding to a rotation angular velocity. The piezoelectric element 14c is used for feedback when the vibrating body 12 is bending-mode vibrated.

Resistors 22 and 24 are respectively connected to the piezoelectric elements 14a and 14b. An oscillator circuit 26 is connected between these resistors 22, 24 and the piezoelectric element 14c. The oscillator circuit 26 includes an inverse amplification circuit 28 and a phase circuit 30. The output signal of the piezoelectric element 14c is fed back to the inverse amplification circuit 28 and the output signal of the inverse amplification circuit 28 is phase corrected by the phase circuit 30 and inputted to the piezoelectric elements 14a and 14b. Thereby, the vibrating body 12 is self-excited for bending-mode vibration in a direction perpendicular to the surface of formation of the piezoelectric element 14c.

Further, the piezoelectric elements 14a and 14b are connected to an input terminal of a differential amplification circuit 32. A signal from an addition signal computing unit 34 is added by an adder 33 to the output signal of the differential amplification circuit 32. The output signal of the phase circuit 30 is inputted to the addition signal computing unit 34, and a signal of a same phase or inverse phase to this output signal is outputted from the addition signal computing unit 34. At this time, in the addition signal computing unit 34, as will be explained later, the level of the output signal is adjusted.

An adder 33 forms a composite of the output signal of the differential amplification circuit 32 and the output signal of the addition signal computing unit 34. The output of the adder 33 is inputted to a synchronous detector 36, which uses the output signal of the inverse amplification circuit 28 as a trigger or timing signal for synchronously detecting the composite signal. Then, the output signal of the synchronous detector 36 is smoothed by a smoothing circuit 38.

Figure 4:
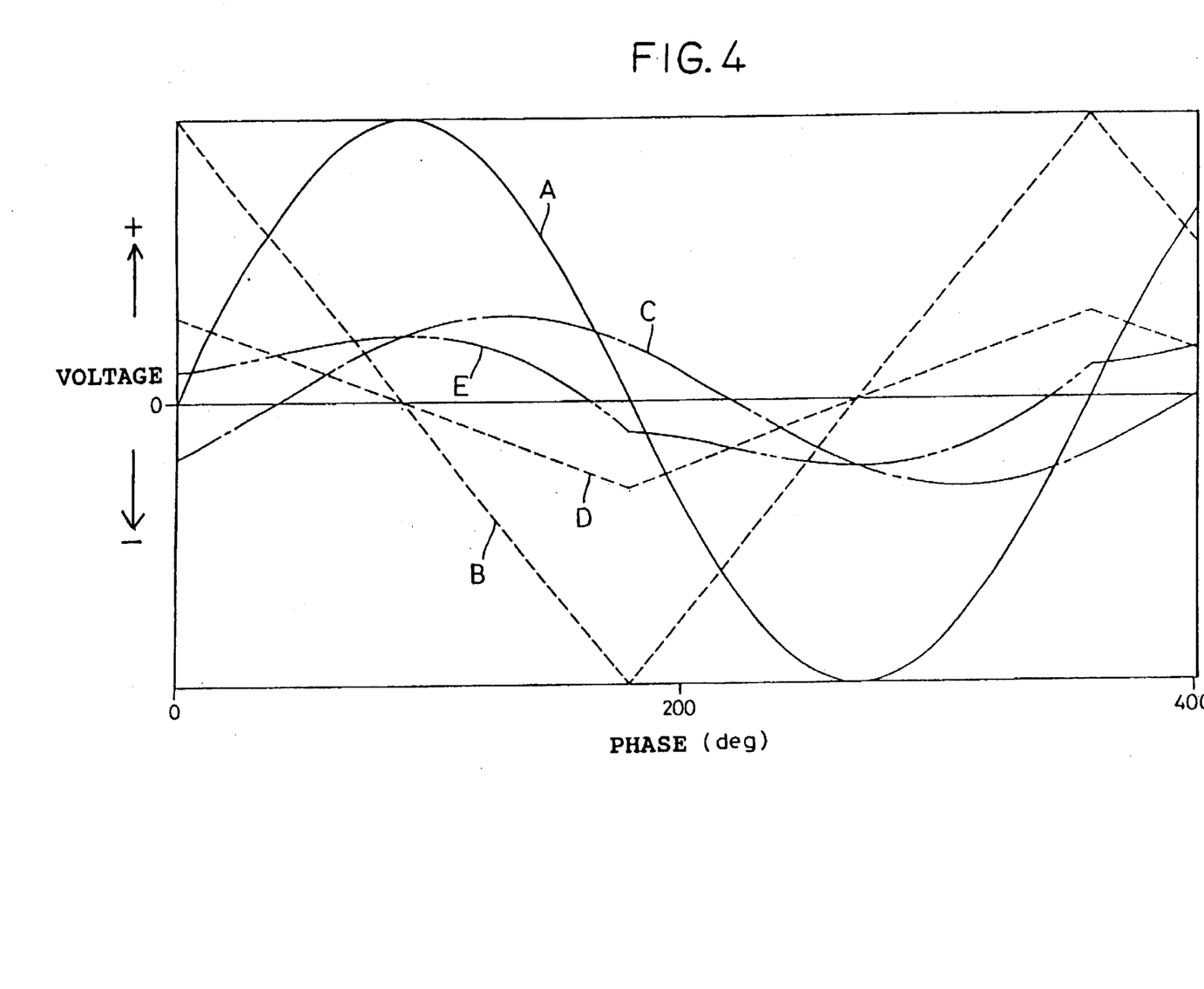
FIG. 4 is a graph showing signal wave forms of each portion of the, oscillation gyroscope shown in FIG. 1.

In the oscillation gyroscope 10 shown in FIG. 1, the vibrating body 12 is bending-mode vibrated in a direction perpendicular to the formation surface of the piezoelectric element 14c by the oscillator circuit 26. By means of this bending-mode vibration, a sine wave A is outputted from the piezoelectric element 14c as shown in FIG. 4. This signal is inverse amplified by the inverse amplification circuit 28 and phase corrected by the phase circuit 30, and a signal B having a phase difference of 90° to the output signal of the piezoelectric element 14c is outputted from the phase circuit 30. The output signal of the phase circuit 30 is applied to the piezoelectric elements 14a and 14b so that the vibrating body 12 is self-excited.

At this time, due to variations in the impedance of the piezoelectric elements 14a and 14b and variations in the characteristic of the vibration system including the piezoelectric elements 14a and 14b, a signal C of a different phase than the output signal B of the phase circuit 30 is outputted from the differential amplification circuit 32. This signal C is synchronized with the signal A and detected, and when the resulting signal is soothed, a signal is outputted from the smoothing circuit 38 even without a rotation angular velocity being applied to the oscillation gyroscope 10.

In order to reduce the level of the output signal of the differential amplification circuit 32, a signal D having a phase difference of 90° in the advance direction or delay direction of the signal A is added to the output signal of the differential amplification circuit 32. In this embodiment, an addition signal D whose phase is 90° advanced from the signal A, i.e. an addition signal which is advanced by a phase of 90 degrees from the output signal from the piezoelectric element 14c, is outputted from the addition signal computing unit 34 and added by the adder 33 to the output signal of the differential amplification circuit 32.

At this time, as described later, in the portion of the cycle at which the output signal A of the piezoelectric element 14c is at its maximum level for example, the level of the addition signal D is adjusted so that a composite signal E made up of the output signal C and the addition signal D is at its maximum level. In other words, the level of the output signal from the adder 33 at the zero-crossing of the addition signal D is the maximum level of the signal E, which is then inputted to the synchronous detector 36. Consequently, by adding such an addition signal D to the output signal C of the differential amplification circuit 32, it can be understood that the level of the output signal of the differential amplification circuit 32 is compressed, i.e. its absolute value is reduced.

In this state, when there is a rotation about the long axis of the vibrating body 12, the direction of the bending-mode vibration of the vibrating body 12 changes due to Coriolis force. As a result, a signal of the same phase or an inverted phase with respect to the signal A is generated in the piezoelectric elements 14a and 14b. The level of this signal is a value corresponding to the rotation angular velocity applied to the vibrating body 12, and the phase thereof is determined by the direction of the rotation angular velocity. This signal is superposed on the output signal E.

Since the signal inputted to the synchronous detector 36 is synchronized with the output signal of the inverse amplification circuit 28 and detected, only the positive portion or the negative portion of the signal corresponding to the rotation angular velocity is detected. Accordingly, after smoothing by the smoothing circuit 38, a direct current signal corresponding to the rotation angle velocity can be obtained. At this time, since a composite signal made up of the signal corresponding to the rotation angular velocity and the signal E is inputted to the synchronous detector 36, the output signal of the smoothing circuit 38 also includes the direct current component of the signal E. Accordingly, by eliminating the direct current component of the signal E in the same manner as in the prior art, only the signal corresponding to the rotation angular velocity is obtained.

In this oscillation gyroscope 10, as explained above, the drive signal-component included in the output signal C is compressed by adding the addition signal D to the output signal C of the differential amplification circuit 32. Thus, in contrast to a case where the addition signal D is not used, even when a signal corresponding to a rotation angular velocity is superposed on the output signal c, the level of the signal inputted to the synchronous detector 36 does not become large. As a result, it is not necessary to increase the dynamic range of the various circuits and power consumption can be reduced.

Also, by compressing the output signal of the differential amplification circuit 32, even without increasing the dynamic range of the circuits, a large signal corresponding to the rotation angular velocity can be outputted from the smoothing circuit 38, and the linearity of the output signal of the oscillation gyroscope 10 can be improved. Further, since the linearity of the output signal of the oscillation gyroscope 10 can be improved, variations in sensitivity due to the direction of the rotation angular velocity can be reduced and the rotation angular velocity can be accurately detected.

Since the addition signal D has a phase difference of 90° with respect to the signal A used as a synchronization signal, after detection by the synchronous detector 36 and smoothing there is no addition signal component in the smoothed output. As a result, there is no effect on the sensitivity, output, etc. of the oscillation gyroscope 10, and automatic addition is possible according to the level of the output signal of the differential amplification circuit 32.

In a modification of the first embodiment, in order to perform compression of the drive signal component, for example, as shown by the dotted line in FIG. 1, a signal from the adder 33, resulting from the addition of the output signal of the differential amplification circuit 32 and the output signal of the addition signal computing unit 34 may be synchronized with a signal having a phase difference of 90° with respect to the signal A (for example the output signal of the phase circuit 30) and detected by a second synchronous detector 50 and its output may be inputted to the addition signal computing unit 34, and the level of the output signal of the addition signal computing unit 34 (addition signal D) may be automatically adjusted.

In other words, the detection output of the second synchronous detector 50 is utilized as an output control signal associated with the level of a direct current component obtained by rectifying the alternating current portion of the detection output or the level of the peak value of such current portion, and the level of the output signal (addition signal D) of the addition signal computing unit 34 supplied by the addition signal computing unit 34 is controlled.

Note that the circuit portion indicated by the dotted lines in FIG. 1 may also be applied to the second and third embodiments shown below in FIG. 5 and FIG. 6.

In the oscillation gyroscope 10 shown in FIG. 1, where offset adjustment has been achieved, i.e. where there is a phase difference of 90° between the signal A and the output signal C of the differential amplification circuit 32, by adjusting the level of the addition, signal D, the signal C can be offset. In such a case, only a signal corresponding to the rotation angular velocity is outputted from the smoothing circuit 38 without any drive signal component being outputted.

Second and Third Embodiments

Note that in the first embodiment described above, the output signal of the phase circuit 30 is inputted to the addition signal computing unit 34 in order to obtain an addition signal. However, as shown in FIG. 5, the output signal of the inverse amplification circuit 28 may be phase corrected by a phase correction circuit 40, whose output is then inputted to the addition signal computing unit 34.

Figure 6:
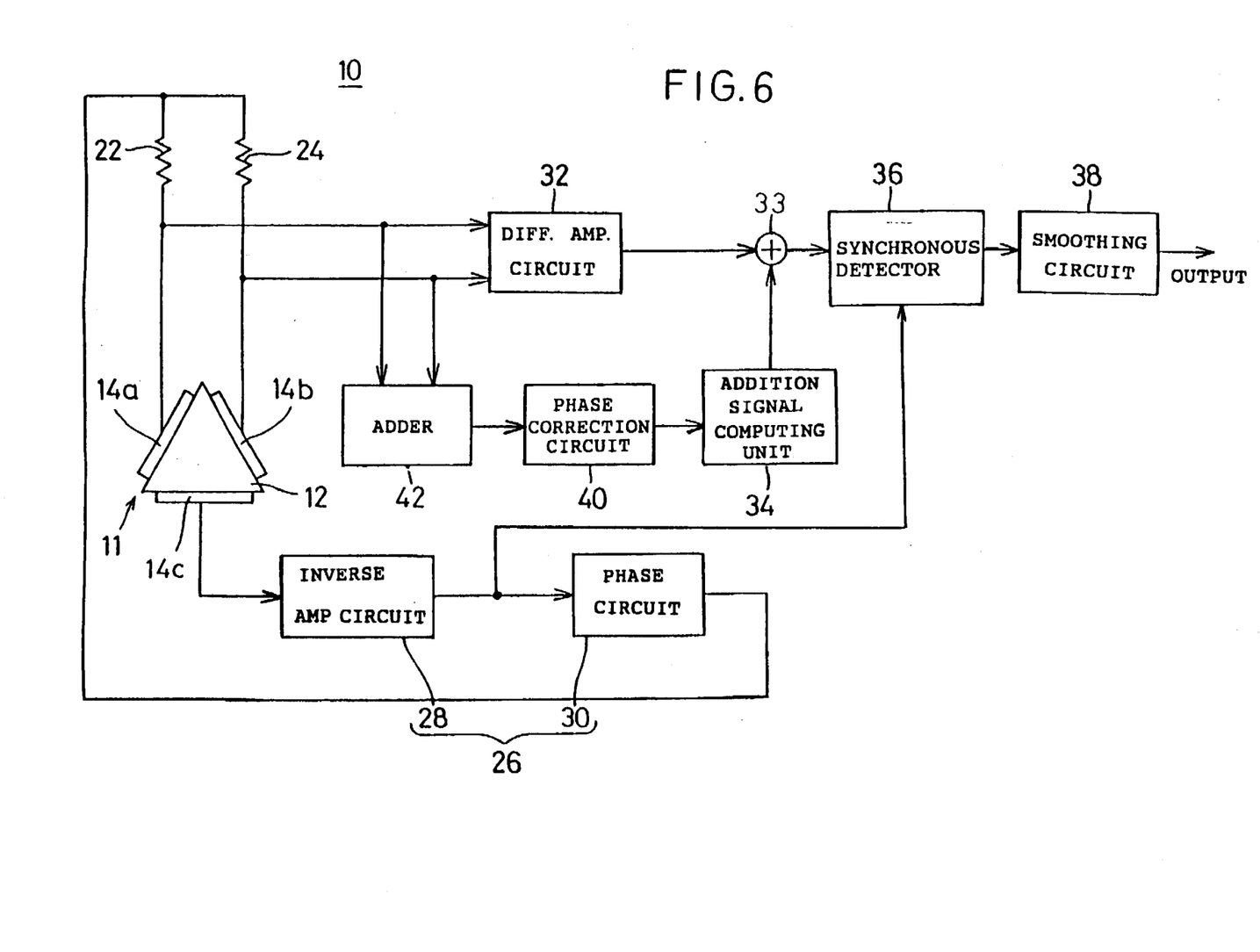
FIG. 6 is an explanatory drawing showing a third embodiment of the present invention.

Also, as shown in FIG. 6, the output signals of the piezoelectric elements 14a and 14b may be synthesized by an adder 42 and the output signal of the adder 42 may be phase corrected by the phase correction circuit 40 and inputted to the addition signal computing unit 34.

Fourth Embodiment

Figure 7:
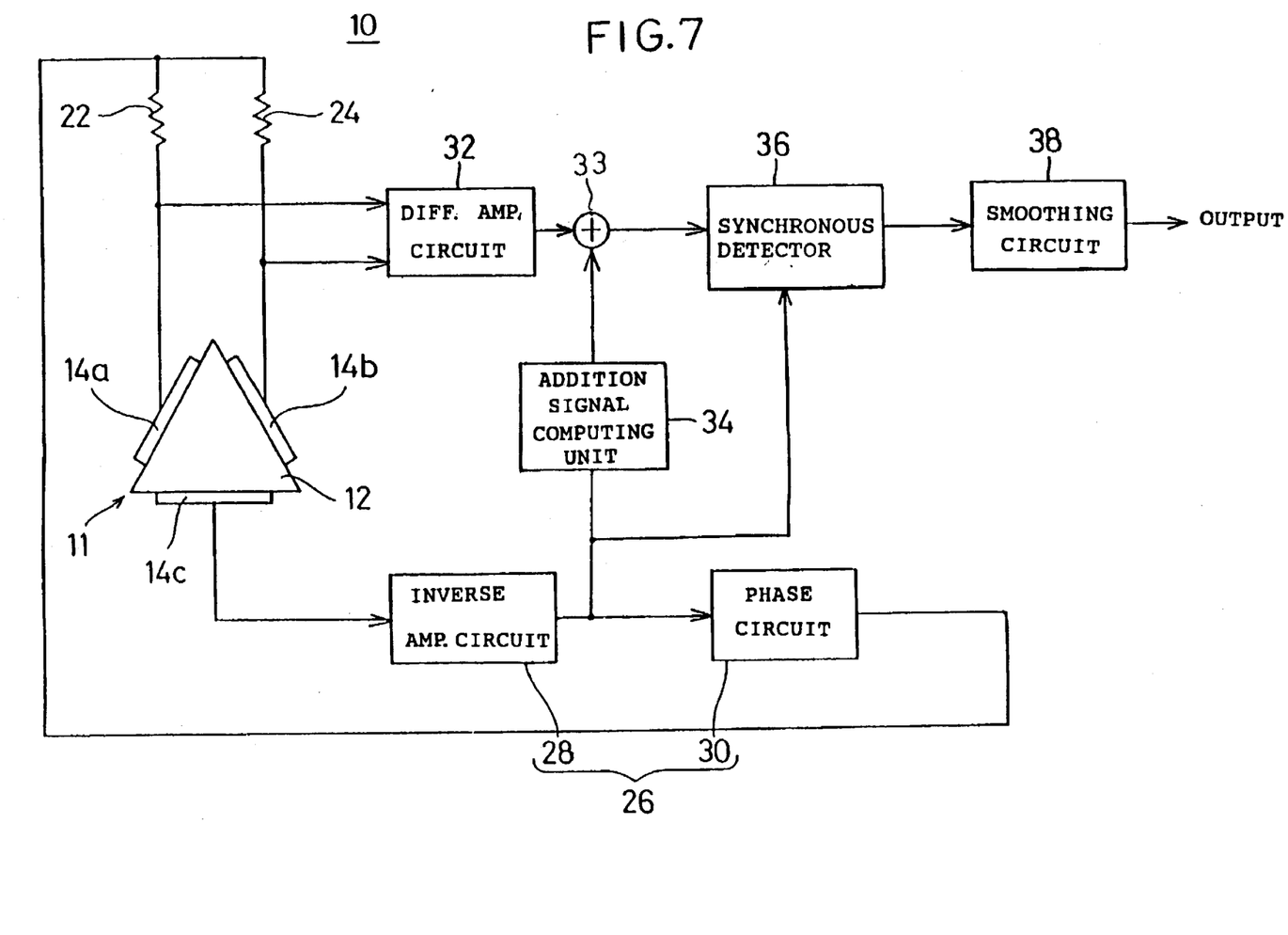
FIG. 7 is an explanatory drawing showing a fourth embodiment of the present invention.

In the embodiment shown in FIG. 7, the output signal of the inverse amplification circuit 28 is inputted to the addition signal computing unit 34, and then, a signal of the same or an inverse phase with respect to this signal is outputted from the addition signal computing unit 34. The addition signal computing unit 34 can adjust the level of the output signal. A signal synthesized by the adder 33 from the output signal of the differential amplification circuit 32 and the output signal of the addition signal computing unit 34 is inputted to the synchronous detector 36. In the synchronous detector 36 the signal is synchronized with the output signal of the inverse amplification circuit 28 and the resultant signal is detected. Further, the output signal of the synchronous detector 36 is smoothed by the smoothing circuit 38.

Figure 8:
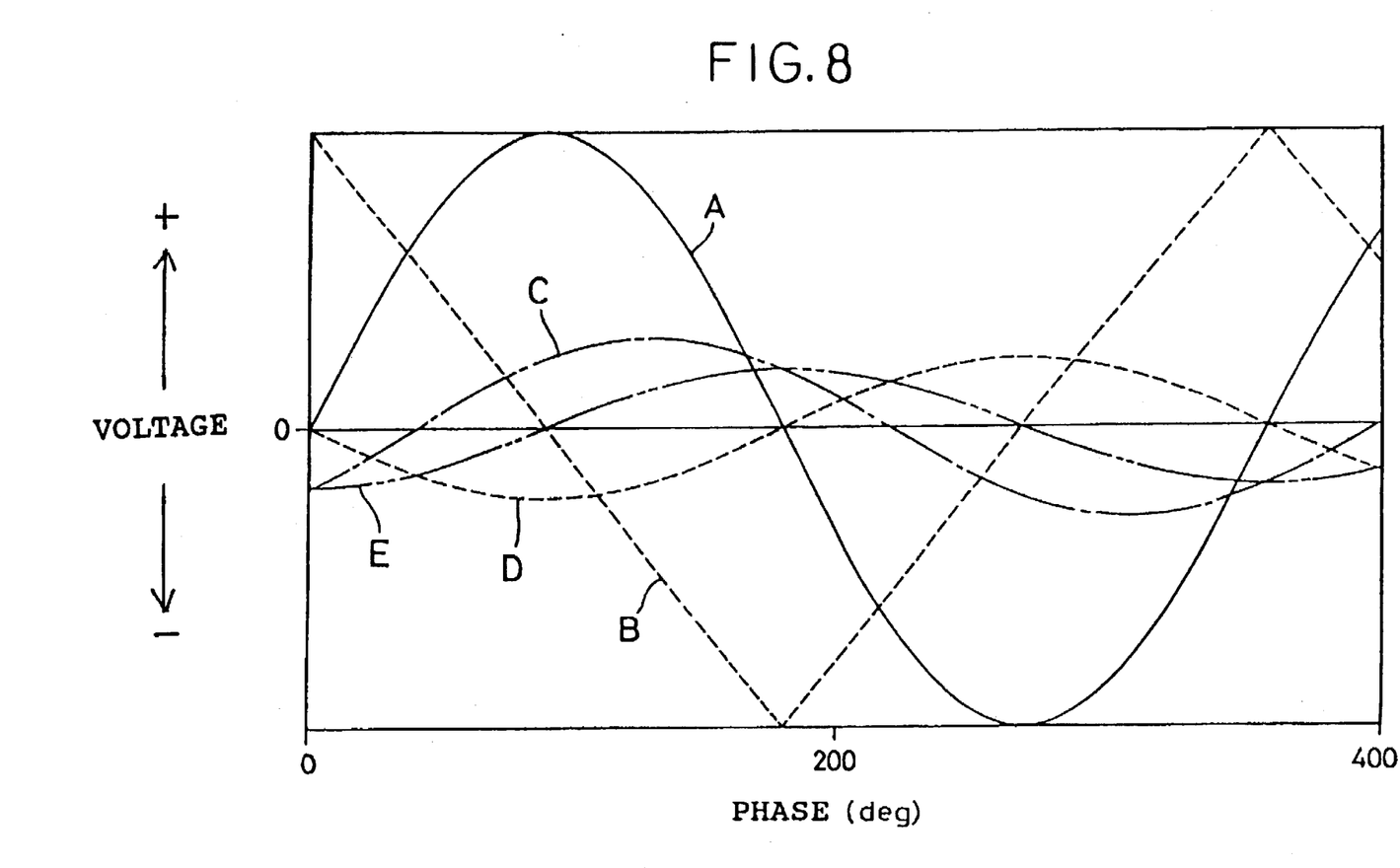
FIG. 8 is a graph showing signal wave forms of each portion of the oscillation gyroscope shown in FIG. 7.

In the embodiment shown in FIG. 7, the vibrating body 12 bending-mode vibrates in a direction perpendicular to the formation surface of the piezoelectric element 14c by means of the oscillator circuit 26. Due to this bending-mode vibration, a sine wave A as shown in FIG. 8 is outputted from the piezoelectric element 14c. This signal is inverse amplified by the inverse amplification circuit 28 and phase corrected by the phase circuit 30, and a signal B having a phase difference of 90° to the output signal of the piezoelectric element 14c is outputted from the phase circuit 30. This output signal B of the phase circuit 30 is applied to the piezoelectric elements 14a and 14b and the vibrating body 12 is thereby self-excited.

At this time, due to variations in the impedance of the piezoelectric elements 14a and 14b, variations in the characteristic of the vibration system including the piezoelectric elements 14a and 14b, etc., a signal C having a different phase with respect to the output signal of the phase circuit 30 is outputted. This signal C is synchronized with the signal A and detected, and upon the resulting signal being smoothed, a signal is outputted from the smoothing circuit 38, even when no rotation angular velocity is impressed upon the oscillation gyroscope 10.

Thus, in order to perform offset adjustment, a signal having the same or an inverse phase to the signal A is added by the adder 33 to the output signal of the differential amplification circuit 32. In this embodiment, an addition signal of inverse phase with respect to the signal A, i.e. an addition signal D of the same phase as the output signal of the inverse amplification circuit 28,. is outputted from the addition signal computing unit 34 and added to the output signal of the differential amplification circuit 32.

At this time, at the maximum level portion of the cycle of the output signal A of the piezoelectric element 14c, the level of the addition signal D is set so that the composite signal E synthesized from the output signal C of the differential amplification circuit 32 and the addition signal D is zero. Accordingly, in the synchronous detector 36, if the positive portion of the signal A for example, i.e. the negative portion of the output signal of the inverse amplification circuit 28, is synchronized and the signal E is detected, the areas of the positive portion and the negative portion of the signal E are equivalent. Thus, if the output signal of the synchronous detector 36 is smoothed by the smoothing circuit 38, the output signal thereof is zero, i.e. offset adjusted. Further, since in this way the addition signal D is added to the output signal of the differential amplification circuit 32, it can be understood that the level of the output signal of the differential amplification circuit 32 is compressed, i.e. its absolute value is reduced.

In this state, upon rotation about the long axis of the vibrating body 12, the direction of the bending-mode vibration of the vibrating body 12 is changed by the Coriolis force. As a result, a signal of a same phase or inverse phase with respect to the signal A is generated in the piezoelectric elements 14a and 14b. The signal level thereof is a value corresponding to the level of the rotation angular velocity impressed upon the vibrating body 12, whose phase is determined by the direction of the rotation angular velocity. This signal is superposed on the output signal E. Because the signal inputted to the synchronous detector 36 is synchronized with the output signal of the inverse amplification circuit 28 and detected, only the positive portion or the negative portion of the signal corresponding to the rotation angular velocity is detected. Accordingly, after smoothing by the smoothing circuit 38, a direct current signal corresponding to the rotation angular velocity can be obtained. At this time, because the drive signal component is zero, only a signal corresponding to the rotation angular velocity is obtained.

Also in the oscillation gyroscope 10 shown in FIG. 7, the drive signal component is compressed by adding the addition signal, in contrast to a case where the addition signal is not utilized. Thus, even when the signal corresponding to the rotation angular velocity is superposed, the level of the signal inputted to the synchronous detector 36 does not become large. As a consequence, it is not necessary to increase the dynamic range of the circuit portion and energy consumption can be reduced.

Also, by compressing the output signal of the differential amplification circuit 32, even without increasing the dynamic range of the circuit portion, a large signal corresponding to the rotation angular velocity can be outputted from the smoothing circuit 38 and the linearity of the output signal of the oscillation gyroscope 10 can be improved. Further, because the linearity of the output signal of the oscillation gyroscope 10 can be improved, variations in sensitivity according to the direction of the rotation angular velocity can be reduced and the rotation angular velocity can be accurately detected. In this manner, in order to perform compression of the drive signal component as well as performing offset adjustment, the level of the addition signal D may be adjusted so that the output signal of the smoothing circuit 38 is zero when no rotation angular velocity is applied.

Fifth and Sixth Embodiments

Note that in the embodiment shown in FIG. 7, the output signal of the inverse amplification circuit 28 is inputted to the addition signal computing unit 34. However, as shown in FIG. 9, the output signal of the phase circuit 30 may be phase corrected by the phase correction circuit 40 and inputted to the addition signal computing unit 34.

Figure 10:
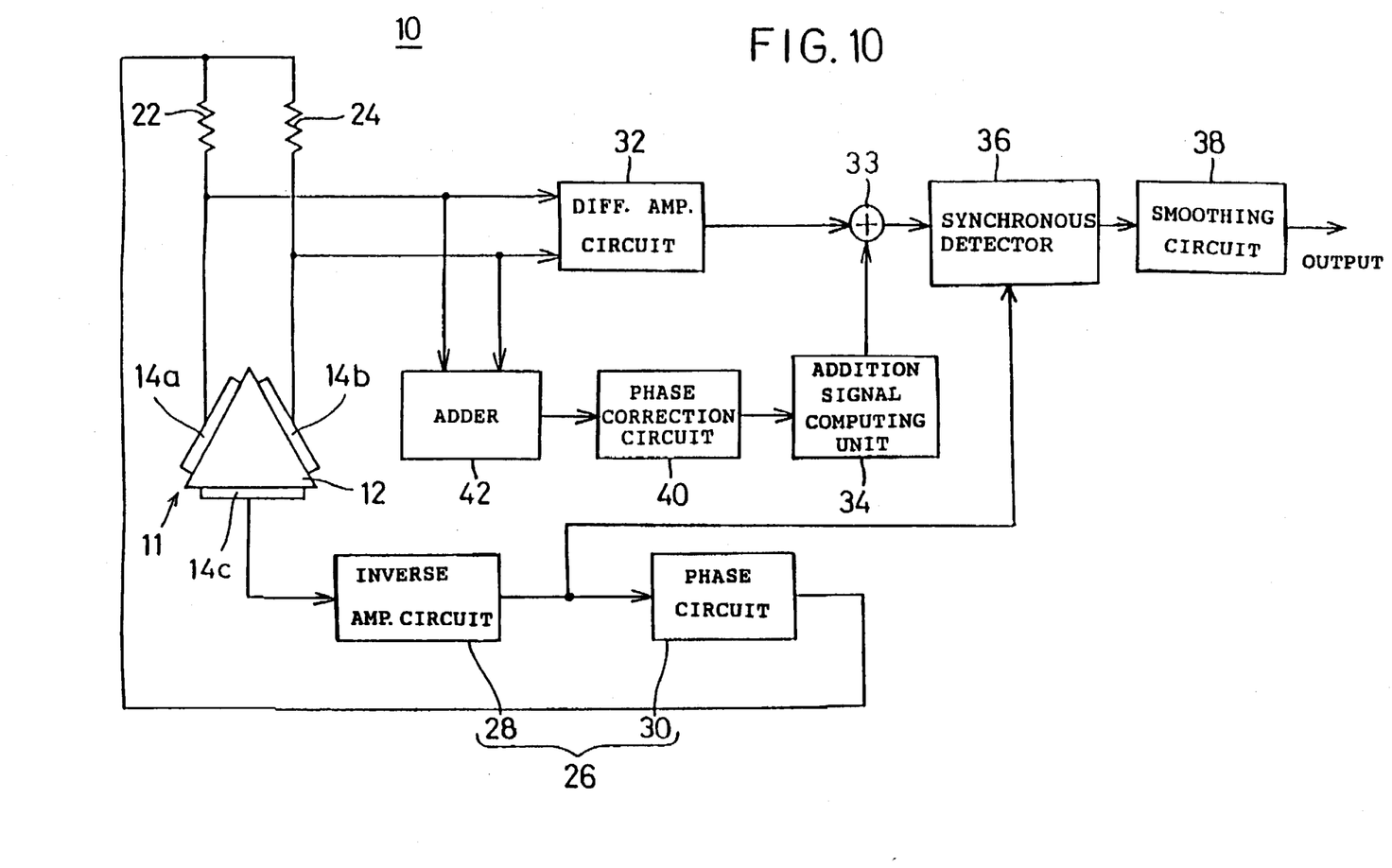
FIG. 10 is an explanatory drawing showing a sixth embodiment of the present invention.

Also, as shown in FIG. 10, the output signals of the piezoelectric elements 14a and 14b may be synthesized by the adder 42 and the output signal of the adder 42 may be phase corrected by the phase correction circuit 40 and its output then inputted to the addition signal computing unit 34.

Seventh Embodiment

Figure 5:
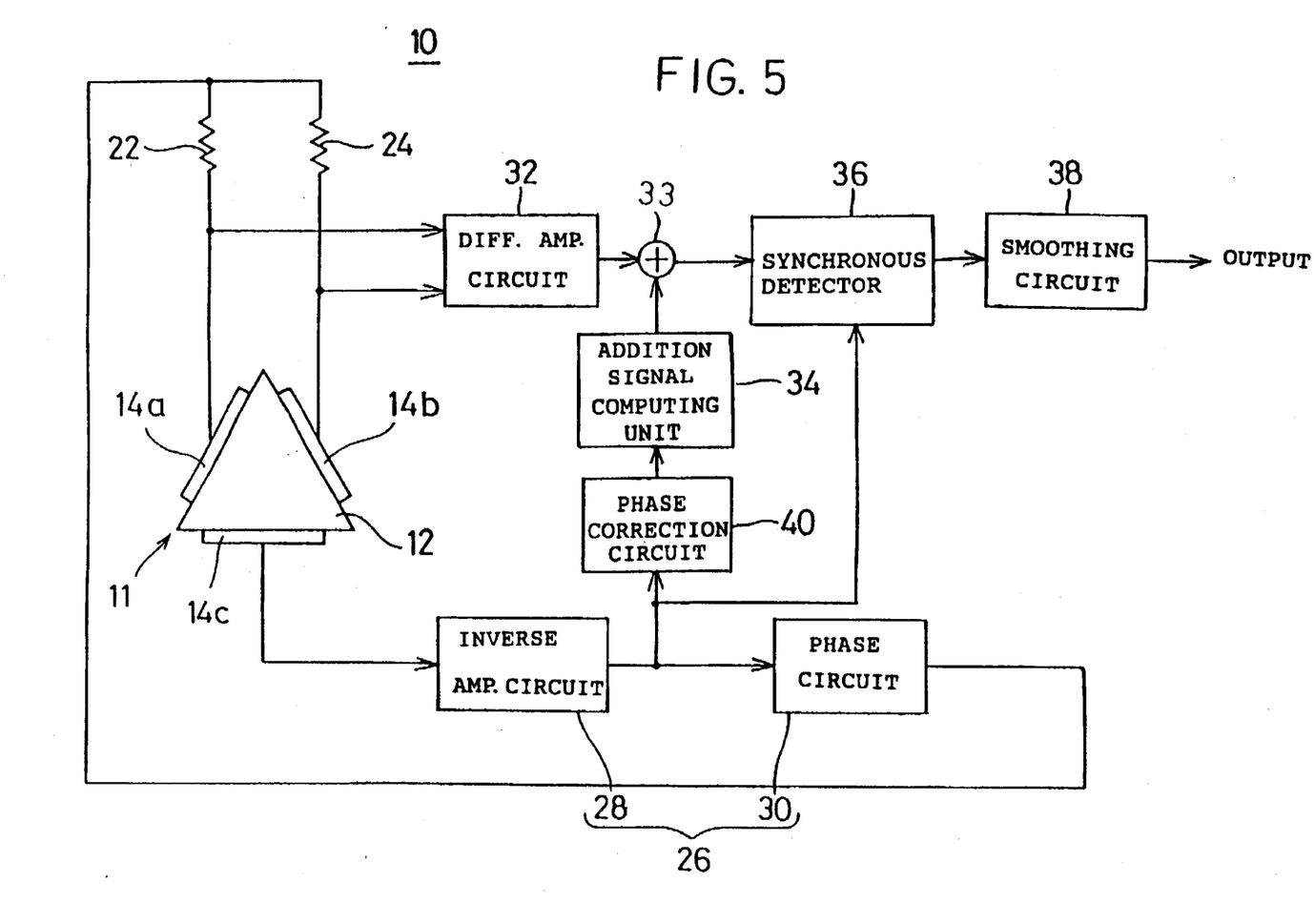
FIG. 5 is an explanatory drawing showing a second embodiment of the present invention.
Figure 9:
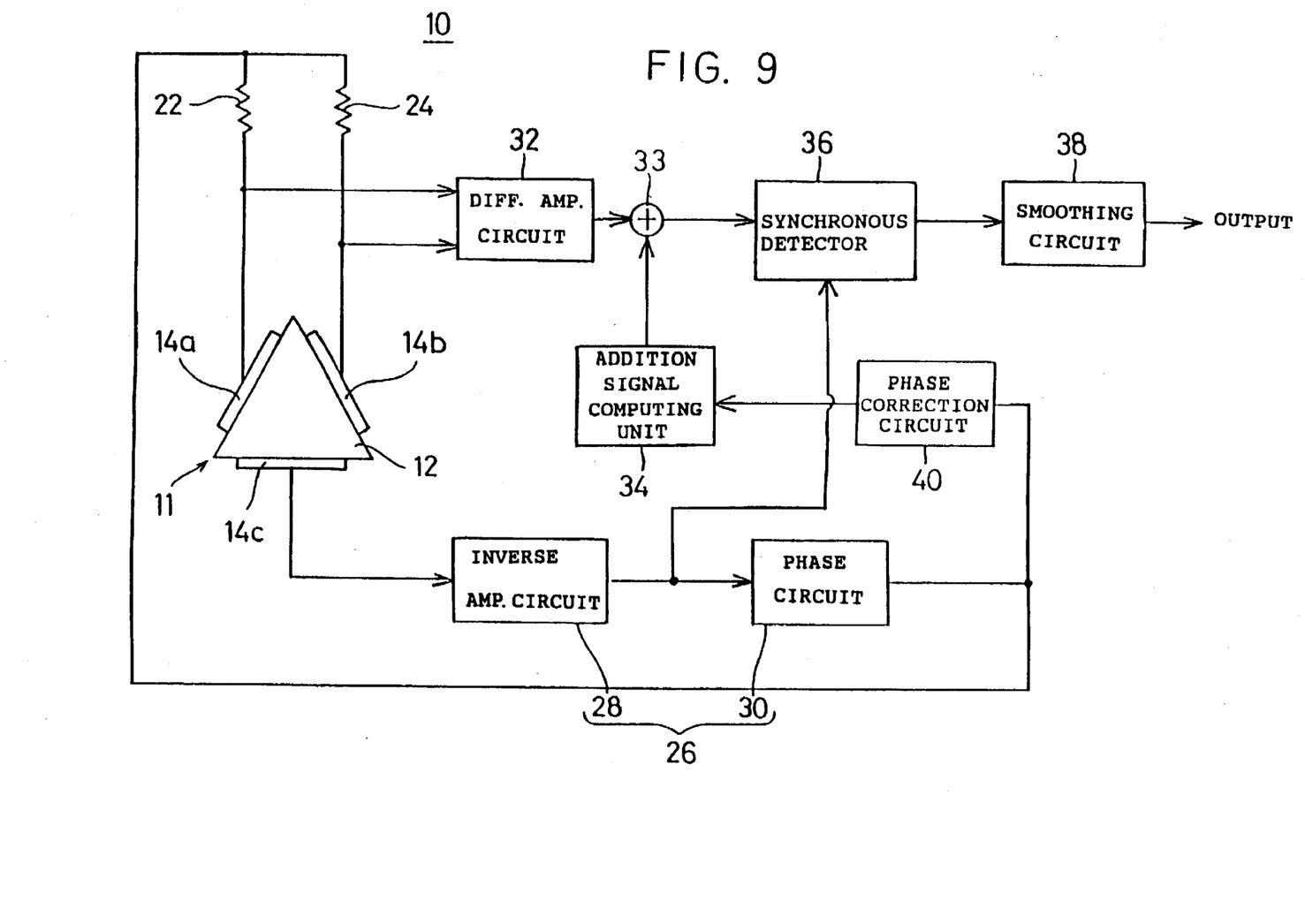
FIG. 9 is an explanatory drawing showing a fifth embodiment of the present invention.

Also, in each of the embodiments shown in FIG. 1, FIG. 5 or FIG. 6, offset adjustment may be performed by a combination of offset adjustment circuit portions shown in any one of the embodiments of FIG. 7, FIG. 9 or FIG. 10 without using prior art circuitry. For example, in FIG. 11, an embodiment is shown in which a second addition signal computing unit 60 corresponding to the addition signal computing unit 34 shown in FIG. 7 is added to the circuit shown in FIG. 1.

In FIG. 7, an output signal of the inverse amplification circuit 28 is provided to the input terminal of the addition signal computing unit 34. The output signal appearing at the output terminal of the addition signal computing unit 34 shown in FIG. 7 is superposed on the output signal of the differential amplification circuit 32 shown in FIG. 1.

Figure 11:
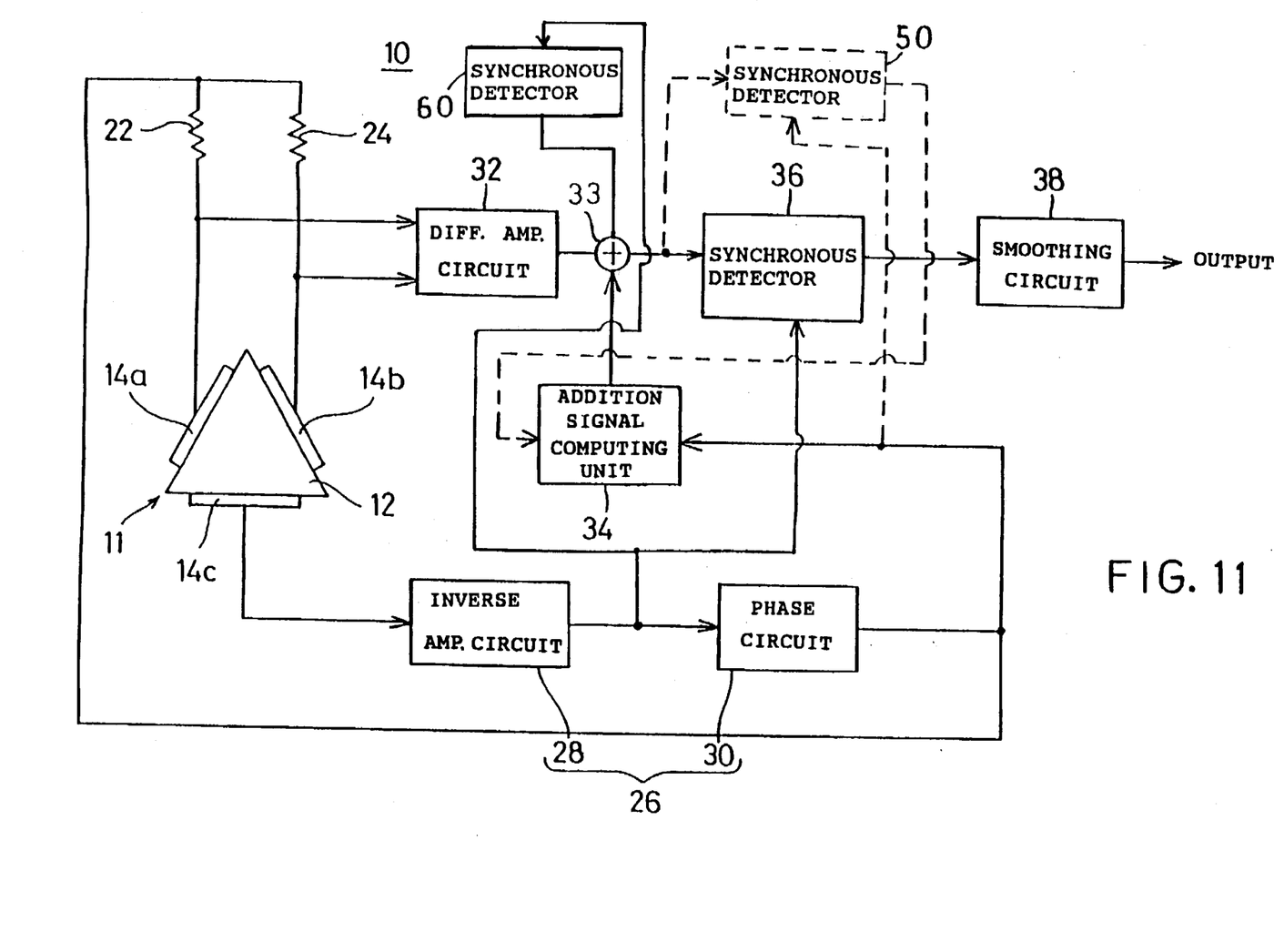
FIG. 11 is an explanatory drawing showing a seventh embodiment of the present invention.

In other words, in FIG. 11, the addition signal computing unit 34 is the same as that shown in FIG. 1 and the second addition signal computing unit 60 is the same as the addition signal computing unit 34 shown in FIG. 7.

In the same manner, a combination of the embodiment of FIG. 1 and the embodiment of FIG. 9, a combination of the embodiment of FIG. 1 and the embodiment of FIG. 10, a combination of the embodiment of FIG. 5 and the embodiment of FIG. 7, a combination of the embodiment of FIG. 5 and the embodiment of FIG. 9, a combination of the embodiment of FIG. 5 and the embodiment of FIG. 10, a combination of the embodiment of FIG. 6 and the embodiment of FIG. 7, a combination of the embodiment of FIG. 6 and the embodiment of FIG. 9, and a combination of the embodiment of FIG. 6 and the embodiment of FIG. 10, can all be made, to thereby obtain the combined advantages of the respective embodiments.

Also, in each of the above-described embodiments, although the piezoelectric elements 14a, 14b and 14c are bonded to the vibrating body 12 to form an oscillator 11, the vibrating body 12 may be formed of a piezoelectric material and electrodes may be formed in place of the piezoelectric elements 14a to 14c. Further, the shape of the vibrating body 12 is not limited to an equilateral triangular prism shape, but may be formed in another prism shape or a cylindrical shape. These oscillators can be applied to the present invention if a plurality of driven detection piezoelectric elements or electrodes are formed.

Although the present invention has been described in relation to particular embodiments thereof, many other variations and modifications and other uses will become apparent to those skilled in the art. Therefore, the present invention is not limited by the specific disclosure herein.

What is claimed is:

1. An oscillation gyroscope comprising:

a drivable vibrating body;

a plurality of drive/detection devices associated with said vibrating body and operable for both driving said vibrating body and detecting signals corresponding to a rotation angular velocity of said vibrating body;

an oscillator circuit, connected to said drive/detection devices, for driving said vibrating body;

a differential circuit connected to said drive/detection devices for receiving said signals from each of said drive/detection devices and outputting a differential output signal corresponding to the rotation angular velocity;

an addition signal computing unit for computing at least one signal having a phase difference with respect to said differential signal; and an adder for adding the respective outputs of said differential circuit and said addition signal computing circuit;

wherein said phase difference and an amplitude of said at least one signal from said additional signal computing unit are such that an adder output signal from said adder obtained by adding said at least one signal and said differential output signal under the condition that no rotation angular velocity is applied to said vibrating body has an amplitude less than that of said differential output signal.

2. The oscillation gyroscope according to claim 1, wherein said phase difference is 90°, said oscillator circuit includes an inverse amplification circuit and a phase circuit for adjusting a phase of an output signal of said inverse amplification circuit, and an output signal of said phase circuit is inputted to said addition signal computing unit.

3. The oscillation gyroscope according to claim 1, wherein said phase difference is 90° said oscillator circuit includes an inverse amplification circuit and a phase circuit for adjusting a phase of an output signal of said inverse amplification circuit, and said oscillator circuit further includes a phase correction circuit for modifying the phase of the output signal of said inverse amplification circuit, and an output signal of said phase correction circuit is inputted to said addition signal computing unit.

4. The oscillation gyroscope according to claim 1, wherein said phase difference is 90°, further comprising a summation circuit for synthesizing an output signal of the plurality of said drive/detection devices and a phase correction circuit for modifying a phase of an output signal of said summation circuit, and wherein an output signal of said phase correction circuit is inputted to said addition signal computing unit.

5. The oscillation gyroscope according to claim 1, wherein said phase difference is 0°, said oscillator circuit includes an inverse amplification circuit and a phase circuit for adjusting a phase of an output signal of said inverse amplification circuit, and an output signal of said phase circuit is inputted to said addition signal computing unit.

6. The oscillation gyroscope according to claim 1, wherein said phase difference is 0°, further including a phase correction circuit for modifying the phase of the output signal of said inverse amplification circuit, and wherein an output signal of said phase correction circuit is inputted to said addition signal computing unit.

7. The oscillation gyroscope according to claim 1, wherein said phase difference is 0°, further comprising a summation circuit for synthesizing an output signal of the plurality of said drive/detection devices and a phase correction circuit for modifying a phase of an output signal of said summation circuit, and wherein an output signal of said phase correction circuit is inputted to said addition signal computing unit.

8. The oscillation gyroscope according to claim 1, wherein said phase difference is 180°, said oscillator circuit includes an inverse amplification circuit and a phase circuit for adjusting a phase of an output signal of said inverse amplification circuit, and an output signal of said phase circuit is inputted to said addition signal computing unit.

9. The oscillation gyroscope according to claim 1, wherein said phase difference is 180°, further including a phase correction circuit for modifying the phase of the output signal of said inverse amplification circuit, and wherein an output signal of said phase correction circuit is inputted to said addition signal computing unit.

10. The oscillation gyroscope according to claim 1, wherein said phase difference is 180°, further comprising a summation circuit for synthesizing an output signal of the plurality of said drive/detection devices and a phase correction circuit for modifying a phase of an output signal of said summation circuit, and wherein an output signal of said phase correction circuit is inputted to said addition signal computing unit.

11. The oscillation gyroscope according to claim 1, further comprising a synchronous detector wherein a signal made up of said differential output signal of said differential circuit and an output signal of said addition signal computing unit is detected by being synchronized with signals corresponding to rotation angular velocities in the synchronous detector, and the output of the synchronous detector is supplied to the addition signal computing unit so as to control the level of an output signal of the addition signal computing unit.

12. The oscillation gyroscope according to claim 1, wherein said phase difference and said amplitude of said at least one signal are such that said adder output signal has its maximum level when said at least one signal has a zero level.

* * * * *